Figure 1:
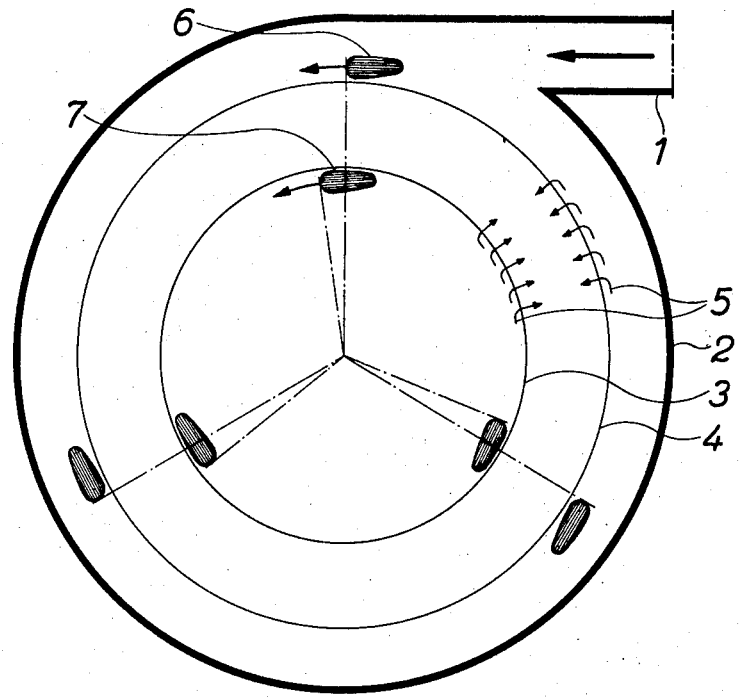

United States Patent

Syrjanen

[15] 3,672,506
[45] June 27, 1972

[54] PRESSURE STRAINER DEVICE

[72] Inventor: Ahti Syrjanen, Valkeakoski, Finland

[73] Assignee: Jylhavaara Osakeyhtio, Valkeakoski, Finland

[22] Filed: May 6, 1970

[21] Appl. No.: 34,974

[52] U.S. Cl. ..............................209/273, 209/306, 209/380, 210/415
[51] Int. Cl. ..........................................................B07b 1/20
[58] Field of Search..................209/273, 305, 306, 386, 389, 209/390, 270, 380; 210/415

[56] References Cited

UNITED STATES PATENTS 3,387,708   6/1968   Salomon et al. ....................209/379 X Primary Examiner—Frank W. Lutter
Assistant Examiner—William Cuchlinski, Jr.
Attorney—Waters, Roditi, Schwartz & Nissen

[57] ABSTRACT

A pressure strainer for cellulose, paper or equivalent pulp suspension, comprising two concentric strainer cylinders for passing acceptable pulp under pressure from the outside of the outer cylinder and from the inside of the inner cylinder into the space between cylinders, whereat in connection with each cylinder there has been provided at least one blade revolving about the cylinder' common axis and having a substantially drop-shaped cross section and which sweeps close to the surface of the strainer cylinder on the side where the pump to be strained is located, whereby the blades in the course of their motion produce in the strainer cylinder with their leading end a pressure pulse and with their trailing end, a vacuum pulse. The blades in association with different strainer cylinders are located with such displacement with reference to each other, or have such mutual angular spacing, that the pressure pulse from the blade of one of the two strainer cylinders enhances the vacuum pulse from the blade of the other strainer cylinder.

Owing to the use of two concentric straining cylinders, large effective straining surface is achieved, in comparison with the size of the device. The blades which sweep close to the surface of the strainer cylinders cause, owing to their drop-shaped form, in the strainer cylinder pressure pulse, or a pressure wave circling around the strainer cylinder, which boosts the flow of acceptable pulp through the strainer cylinder. With their trailing end, again, they produce a vacuum pulse, or a vacuum wave circling around the strainer cylinder, which detaches from the cylinder any larger particles, or particles to be rejected, which adhere to its surface, so that these cannot plug the holes in the strainer. A strainer device illustrative of the use of essentially drop-shaped blades which sweep close to the surfaces of the strainer cylinders with which they are associated, is disclosed, for example in S. M. Solomon et al., U.S. Pat. No. 3,387,708, issued June 11, 1968.

2 Claims, 2 Drawing Figures

PRESSURE STRAINER DEVICE

This invention relates to improvements in pressure strainers for cellulose, paper or equivalent pulp suspension. However, up to now no attention has been paid to the fact that a blade sweeping along the surface of one of the two strainer cylinders causes a pressure and vacuum pulse not only in the respective strainer cylinder but also in the opposite cylinder. The object of the present invention is to accomplish a pressure strainer device in which the blades enhance each other's action. The invention is characterized in that the blades associated with different strainer cylinders are so displaced with reference to each other, i.e. that they are spaced by such angular distance, that the pressure pulse from the blade of one cylinder will reinforce the vacuum pulse from the blade of the other cylinder. Up to now, it has been particularly annoying that fairly large particles plug the holes in the strainer so that acceptable pulp cannot flow through the strainer cylinders without obstruction. With the aid of the invention the vacuum pulse of the blades is now enhanced, which detaches the largest particles from the surface of the strainer cylinders.

Since the blades associated with different cylinders revolve at the same angular velocity, the velocity of propagation of the blades on the inner cylinder is smaller than that of the blades on the outer cylinder. It follows that the pressure and vacuum wave produced by the inner blades is weaker, and the particular difficulty has indeed been experienced that fairly large particles tend to adhere to the surface of the inner strainer cylinder. This drawback is eliminated by means of a pressure strainer device according to an advantageous embodiment of the invention, which is characterized in that the blades are positioned with such displacement with reference to each other that the pressure pulse from the outer blade will enhance the vacuum pulse from the inner blade. In this manner the pressure pulse or pressure wave acting on the inner cylinder will become powerful enough to remove fairly large particles from the surface of the strainer cylinder.

Figure 2:
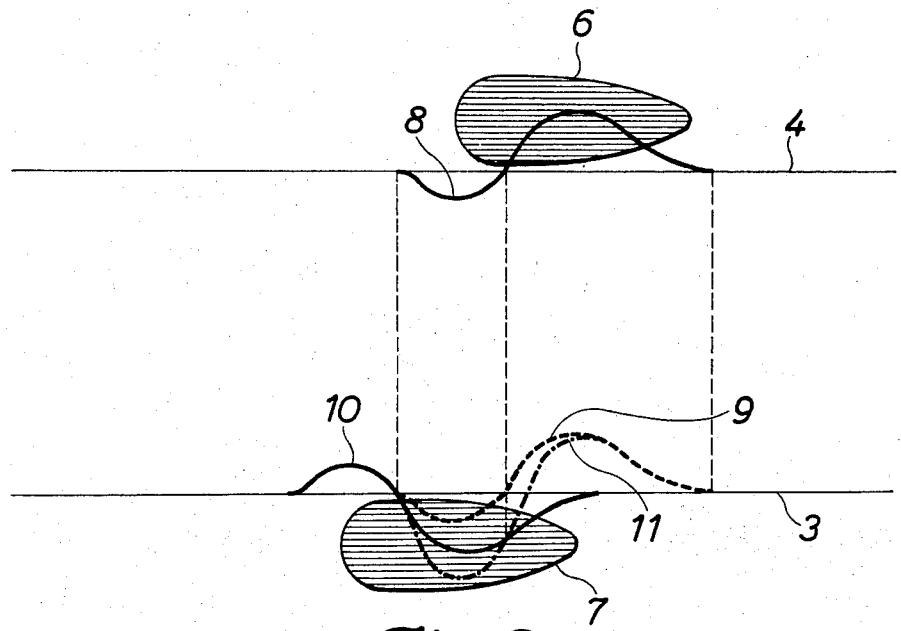

The invention is described by way of an example in the following with reference to the attached drawing, in which FIG. 1 shows schematically a pressure strainer device, as seen from above, and FIG. 2 presents a detail, on larger scale.

Pulp suspension is fed under pressure, tangentially through the pipe 1 into the mantle 2. The space between the strainer cylinders 3 and 4 is closed on top so that acceptable pulp has access to the said space only through the straining surfaces, as has been indicated by arrows 5. It should be noted that the pulp suspension to be strained also fills the space inside the inner strainer cylinder 3, into which it flows by a route over the top of the strainer cylinders. The acceptable pulp flows downwardly in the space between the strainer cylinders 3 and 4 and escapes through a drain pipe (not depicted). The rejected pulp, again, flows downwardly on the outside of the outer strainer cylinder and on the inside of the inner strainer cylinder 3 and escapes through its own drain pipe (not depicted). On the outside of the outer strainer cylinder 4 three vertical blades 6 have been provided. Likewise, three vertical blades 7 have been provided on the inside of the inner strainer cylinder 3. The blades 6 and 7 revolve about the axis of the strainer cylinders 3 and 4 counterclockwise in FIG. 1. The cross section of the blades 6 and 7 is substantially drop-shaped so that they cause in their respective strainer cylinders with their leading ends a pressure pulse, or a pressure wave progressing along the strainer cylinder, and with their trailing ends a vacuum pulse, or a vacuum wave. The pressure waves push acceptable pulp through the strainer cylinders 3 and 4, while the vacuum waves detach from the surfaces of the strainer cylinders any fairly large particles that have adhered to them. According to the invention the blade 6 of the outer strainer cylinder 4 has been arranged to travel at a given angular distance from the blade 7 of the inner strainer cylinder 3, as can best be seen from FIG. 2, in which for the sake of clarity the strainer cylinders 3 and 4 have been shown as developed into a plane. The blade 6 produces in the strainer cylinder 4 with its leading end a pressure wave and with its trailing end a vacuum wave. The shape of the pressure-and-vacuum wave has been indicated with the curve 8. This pressure-and-vacuum wave passes through the strainer cylinder 4 and acts upon the strainer cylinder 3, where the same pressure-and-vacuum wave has been reproduced by curve 9, drawn as a dotted line. The blade 7 in its turn also produces in the strainer cylinder 3 a pressure-and-vacuum wave, which is illustrated by the curve 10. The blades 6 and 7 are located at such angular distance of each other that the pressure pulse of blade 6, which at the location of blade 7 acts as a vacuum pulse, coincides with the location of the vacuum pulse from blade 7. It follows that these two enhance each other so that the vacuum pulse achieves great magnitude at blade 7. This is of considerable importance since the velocity of propagation of blade 7 is smaller than that of blade 6, whereby also the vacuum pulse caused by the former alone is correspondingly weaker and insufficient to detach all fairly large particles from the surface of the strainer cylinder 3. The curve 11 drawn as a dot-and-dash line represents the sum of curves 9 and 10 at the strainer cylinder 3.

In FIG. 2 the representation of the pressure-and-vacuum waves has been simplified in order that the effect attainable with the aid of the invention might be readily observable. It is to be understood that the pressure wave produced by blade 6 on strainer cylinder 4 is no longer as strong at the strainer cylinder 3. Moreover, it is obvious that the pressure-and-vacuum wave produced by blade 7 also acts at the strainer cylinder 4, though not at equal strength because the velocity of propagation of blade 7 is smaller.

Various embodiments of the invention may naturally vary within the scope of the claims presented below. For instance, the strainer cylinders 3 and 4 may be somewhat conical in one direction or the other. The blades 6 and 7 need not necessarily be vertical; they may ascend in a manner somewhat resembling a helical line, following the surfaces of the strainer cylinders 3 and 4. Furthermore, a pressure strainer device according to the invention may comprise several pairs of strainer cylinders.

I claim

1. Improvement in a pressure strainer device for cellulose, paper or equivalent pulp suspension, comprising two concentric strainer cylinders for passing acceptable pulp under pressure from the outside of the outer cylinder and from the inside of the inner cylinder into the space between the cylinders, there having been provided in association with each strainer cylinder at least one blade revolving about the axis of the cylinders, which blade has a cross section substantially of drop shape and which sweeps close to that surface of the strainer cylinder which is towards the pulp to be strained, each of the blades in response to motion generating in the associated strainer cylinder with their leading ends a pressure pulse and with their trailing ends a vacuum pulse, wherein the improvement comprises in that the inner and outer blades in association with each of said strainer cylinders are located with such angular displacement with reference to each other that the generated pressure pulse from the blade of one of the two strainer cylinders enhances the vacuum pulse from the blade of the other strainer cylinder.

2. Pressure strainer device according to claim 1, characterized in that the blades are located with such displacement with reference to each other that the pressure pulse from the outer blade enhances the vacuum pulse from the inner blade.

* * * * *